June 21, 1960    L. C. MERTZ ET AL    2,941,730
FLOUR MILLING PROCESS
Filed July 1, 1954
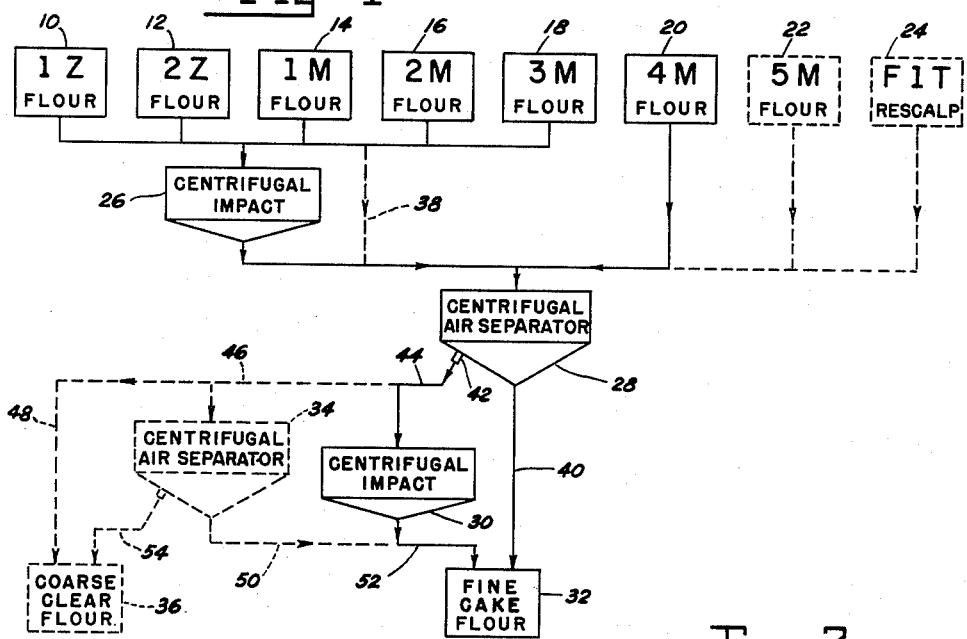
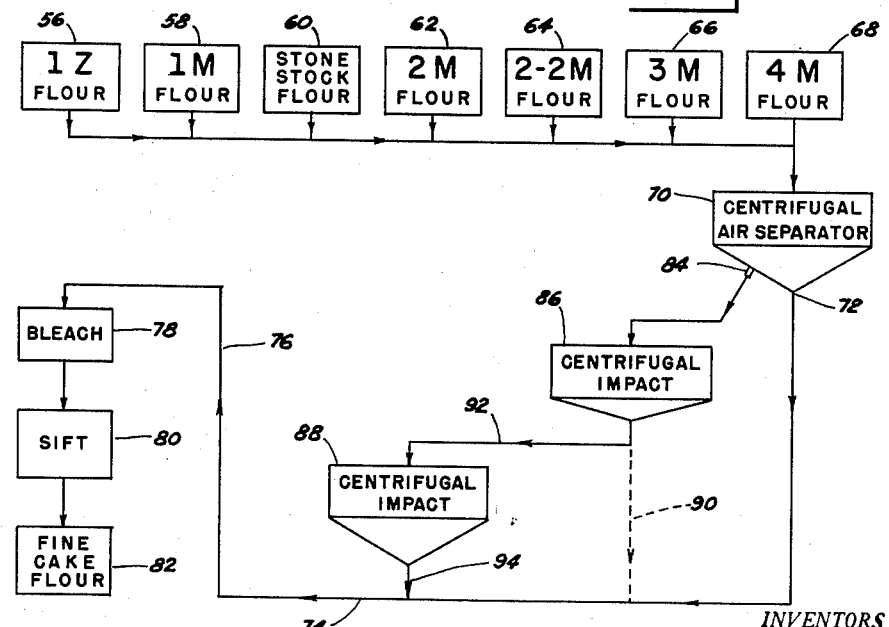
INVENTORS
LYLE C. MERTZ
KENNETH L. NORDSTROM
BY
William C. Babcock
ATTORNEY United States Patent Office 2,941,730
Patented June 21, 1960

2,941,730

FLOUR MILLING PROCESS

Lyle C. Mertz, Hamburg, N.Y., and Kenneth L. Nordstrom, Minneapolis, Minn., assignors to General Mills, Inc., a corporation of Delaware Filed July 1, 1954, Ser. No. 440,734

12 Claims. (Cl. 241—9)

The present invention relates to flour milling and more particularly to a method of improving the characteristics of the finished flour obtained in such a process.

Flour milling processes are well known in which cereal grains such as wheat are broken, classified, purified and reduced by what is generally known as a gradual reduction milling process. Such milling processes normally result in the production of flour which has been sifted through relatively fine silk screens. In the more standard milling processes, the breaking and reduction steps have been accomplished by roller mills. In such cases there is a limit to the percentage of high quality flour which can be obtained in the final product and which can be considered as suitable for special purposes such as the making of cakes and pastries.

Some milling processes have introduced impact methods for the breaking or reduction steps or both in an effort to improve the quality of the final flour. The use of impact machines of one type or another in place of the more usual roller mills for these operations has in many cases, however, been unsatisfactory with softer wheat varieties. Such impact methods, when used in the breaking and reduction stages of a milling process, may also tend to produce a flour with higher ash. This higher ash may result from the disintegration (by impact) of small dirty or branny particles which might be flattened and more readily separated in a roller milling operation. In all milling processes there is a constant problem of increasing the percentage of high quality fine flour, such as that suitable for cake and pastry baking. A small increase in the available yield of such flour as compared to coarser grades or grades of less satisfactory baking characteristics represents a significant economic factor in the over-all milling process.

With these problems of the prior art in view it is accordingly one object of the present invention to provide an improved flour milling process.

A further object is the provision of a flour milling process in which at least one of the normal finished flour streams is subjected to an impact step which further reduces the size of the coarser flour particles without adverse effect on the cake baking characteristics of such flour.

Another object is the provision of a milling process particularly adapted to soft wheat varieties in which at least one of the finished flour streams is classified according to particle size, with only the coarser particles subjected to a further impact reduction step which makes possible their re-combination with the finer flour particles and an increased yield of fine cake flour.

Still another object of the invention is a milling process in which the normal breaking and reduction operations are carried out on roller mills and in which the higher grade finished flour streams are then subjected to an impact reduction step.

A still further object is a milling process in which a given yield of fine quality cake flour can be obtained by suitable selection and processing of fewer high grade finished flour streams than have customarily been used for this purpose in the past.

Other objects and advantagees will be apparent from the following specification in which certain preferred embodiments of the invention are described with particular reference to the accompanying drawings. In these drawings:

Figure 1 is a partial schematic flow diagram of one method of handling the finished flour streams of a soft wheat milling process according to the present invention, and Fig. 2 is a similar diagram showing another application of the present invention to the flour streams of a soft wheat milling process.

In general, the objectives of the present invention are accomplished by subjecting selected normal final flour streams of a grain milling process to an impact reduction step designed to reduce the size of the coarser flour particles without loss of desirable baking characteristics. The average particles size is thus reduced substantially below the limits previously considered acceptable for good cake flour. For example, a normal finished flour stream in which the flour has been sifted through 12xx silk screens or the equivalent, may include flour particles as large as 100 microns (1 micron=$10^{-6}$ meter=.000039 inch) in diameter. Since smaller particles can also pass through such a screen, the average particle size will be somewhat less than 100 microns. In the case of some prior art cake flours, the average particle size has sometimes been as low as 35 microns.

According to the present invention, however, at least the coarser particles of such a normal finished flour stream are further reduced in size. As indicated in the following examples, the coarser particles may be reduced by gentle impact so that all such particles are smaller than 30–35 microns.

The lower limits of such reduction are determined in part by the size of the individual starch granules which make up the flour particles. These individual granules may be considered as small spheres, in which the starch is protected within a spherical shell that does not normally permit substantial water absorption by the starch. Such granules may range from 5 microns to 15–20 microns in size. It has been found that cake flour quality is better when the damage to these individual starch granules is kept to a minimum.

The methods of the present invention thus contemplate reduction of the average particle size substantially below 30–35 microns, but without substantial damage to the protective shells of the individual starch granules. Reduction of the normal finished flour streams by one or more impact steps has been found to yield the desired particle size range with minimum starch damage.

This impact reduction step is preferably combined with a classification step in which the normal final flour streams are graded according to size. Hence only the coarser particles which would be unsatisfactory for fine cake flour need be subjected to such an impact reduction step.

According to the present invention, it has thus been found that the use of an impact reduction step as a final stage of the milling process, after the normal flour streams have been obtained, makes it possible to reduce the particle size of the flour without substantial starch damage or rupturing of the individual starch cells or granules. The average particle size of the flour is substantially reduced, but without breaking down the granular structure to an extent which will provide adverse water absorption characteristics or undesired cake baking characteristics.

By way of illustration, the invention will be described in connection with a flour milling process as shown in Figure 1 in which a plurality of normal finished flour streams are indicated by the boxes at the top of the flow diagram. Eight of these flour streams are illustrated in the figure, those at 10, 12, 14, 16, 18 and 20 corresponding to the first sizings, second sizings, and first, second, third and fourth middlings flour streams respectively, while those shown at 22 and 24 indicate the fifth middlings flour stream and fine first tailings re-scalp flour streams respectively.

The two last-mentioned streams have been illustrated in dotted lines to indicate that they have been normally combined with the other streams according to a prior art cake flour milling process. The present invention, however, as particularly described below, makes it possible to omit these last two streams and obtain equivalent yields of fine cake flour with a smaller number of the finished flour streams than was previously considered possible.

The flow diagram of Figure 1 includes a centrifugal impact reduction unit or step shown schematically at 26, a centrifugal air separator designed to classify or grade the finished flour particles according to size shown at 28, and a further centrifugal impact unit 30 for the coarser flour particles. The finished fine cake flour is indicated at 32. An additional centrifugal air separator is shown in dotted outline at 34 with the coarser clear flour normally considered unsuitable for cake flour indicated by the block at 36.

As background for the disclosure of the present invention, it should be noted that those elements of the flow chart of Figure 1 which have been previously used in one milling process for the production of fine cake flour from soft wheats included the dotted portions of the flow diagram but has not included the centrifugal impact units or steps indicated at 26 and 30. Thus the specific prior milling process which has been modified according to the present invention as shown in Figure 1 involved the combination of ordinary finished flour streams indicated by the blocks 10 through 24 including the fifth middlings flour and fine first tailings re-scalp shown in dotted outline. In this prior method all of these flours were combined and fed directly to an air separator such as that shown at 28.

Thus this prior process would be illustrated by a flow in which the dotted flow line 38 replaced the centrifugal impact unit and its associated flow lines for the first five illustrated flour streams in blocks 10 through 18. According to this prior art method the centrifugal air separator 28 normally discharged the finer flour as indicated by the flow line 40 for packaging as cake flour, while the tailings or coarser particles from the centrifugal air separator 28 were discharged at 42, and normally conveyed according to flow lines 44, 46 and 48 to the coarse clear flour bins 36.

In some cases in the prior art the additional centrifugal air separator shown at 34 was introduced into this stream in lieu of the flow line 48, to separate additional finer particles which might have been included in the tailings of the first separator 28 due to overloading or inefficient operation of such separator. In this alternate prior art case the finer particles from the auxiliary air separator 34 were carried back as indicated by flow lines 50 and 52 to the fine cake flour stream, while the coarser tailings of separator 34 were discharged as shown by flow line 54 into the coarse clear flour stream. It will be understood that the additional centrifugal air separator 34 in this case was designed merely to increase the efficiency of the separator of the final flour streams into fine cake flour and coarse clear flour.

According to an important feature of the present invention, the centrifugal impact unit 30 is introduced as a processing unit for the coarser flour stream discharged at 42 and 44 from the classifying device or air separator 28. Various known types of impact machines can be used for this purpose. Preferably, however, the present invention contemplates the use of a rotary or centrifugal type of impact machine in which the flour is fed to the center of a pin type rotor revolving on a substantially vertical axis. As the rotor rotates at high speed, the flour particles are fed outwardly by centrifugal action and are subjected to repeated impact by the pins of the rotor and by engagement with each other. The particles also receive a further impact as they leave the rotor and strike the inside of the outer cylindrical wall of the unit. This impact step tends to break up the coarser flour particles into smaller individual granules but without substantial starch damage or rupturing of the individual starch cells. The coarser flour particles can accordingly be made small enough to be re-combined into the finer cake flour stream.

In combination with this use of the impact reduction step at 30, the present invention further contemplates the selected use of only the better flour streams, such as the first and second sizings and first, second, third and fourth middlings streams for an equivalent yield of fine cake flour. It has been found that the fifth middlings flour and fine first tailings re-scalp tend to contribute more particles which would be unsuitable for the production of fine cake flour even if such streams were impacted. Thus the omission of these flour streams, coupled with the impact reduction of the coarser particles of the higher grade flour streams, makes it possible to obtain equivalent or better yields of fine cake flour without the introduction of undesired impurities or adverse effect on the baking characteristics.

The invention further contemplates the possibility of selective introduction of an impact reduction step at 26, as applied to some but not all of the finished flour streams prior to their classification by the air separator 28. In this particular case, the centrifugal impact unit of the type described above is illustrated at 26 as applied to the first and second sizings and first, second and third middlings flour streams. These flour streams have been found to have a higher proportion of coarser flour particles than other streams such as the fourth middlings flour stream. Thus the combination of impact reduction steps and classification operations as shown by the heavy lines of the flow diagram makes it possible to utilize substantially all of the higher grade flour streams for the production of a fine cake flour without loss of a substantial percentage of these streams as course clear flour according to the prior art.

Another embodiment of the invention is shown in Fig. 2 which represents the processing of the normal final flour streams of a soft wheat milling process in which fine cake flour is ultimately obtained. Here the flour streams utilized for the production of the finer cake flour include the first sizings, first middlings, stone stock, second middlings, 2—2 middlings, third middlings and fourth middlings flour streams as indicated by the blocks 56, 58, 60, 62, 64, 66 and 68, respectively.

According to the invention, these flour streams are combined and fed to a classifying unit illustrated as a centrifugal air separator 70. The finer particles which pass through the air separator at 72 are fed directly as indicated at 74 and 76 to a final bleaching apparatus at 78 and a final sifting at 80 to produce the finished cake flour at 82.

The coarser particles which are discharged as tailings from the air separator 70 at 84 are fed through one or more impact reduction steps illustrated schematically by centrifugal impact machines at 86 and 88, respectively. If only one impact step is necessary for the particular flour streams involved, the impacted flour may be fed directly back to the finished flour stream as indicated by the flow line 90. If additional impact is desirable, the product of the first impact unit 86 will be fed as shown by flow line 92 to the second unit 88 and then to the final flour stream as shown by flow line 94.

The impact units 86 and 88 are again preferably of the rotary centrifugal type in which pin type rotors are used. The finishing process illustrated in Fig. 2 involves the combination of only the higher grade final flour streams indicated and the subjection of the coarser particles of these streams to an impact reduction step which makes it possible to combine a substantially higher percentage of these flour streams in the final cake flour than has previously been considered possible or desirable.

By way of further illustration of the present invention, the following specific examples are given with particular reference to the flow diagrams mentioned.

Example 1

A soft wheat mix consisting primarily of soft red winter wheats grown in the central areas (Indiana, Illinois, and Michigan) was tempered and subjected to a standard roller milling process. The particular process involved no impact steps, with the exception of a pre-break impact and aspiration ahead of the first break rolls. Normal final flour streams were obtained from the first and second sizings and first, second, third and fourth middlings reduction systems by sifting through standard 12xx silk screens or the substantial equivalent thereof. All of these streams except the fourth middlings flour streams were then combined and fed through a centrifugal impact unit such as that at 26 in Figure 1. This particular unit was of the type commercially available under the trade name "Entoleter" made by the Safety Car Heating and Lighting Co., and included a 27" pin type rotor having substantially 72 pins, rotating on a vertical aixs at a rate of substantially 3,500 r.p.m. The flour passing through this impact unit was then combined with the fourth middlings flour stream and fed to a centrifugal air separator of the type commercially available from the Raymond Pulverizer Division of the Combustion Engineering Company, Inc., as a "whizzer" type of mechancial air separator. The separator was adjusted at a normal setting which segregated a fine flour fraction at 40 in Figure 1 of substantially 87% of the stock fed to the separator, while the coarse or tailings fraction discharged at 42 amounted to substantially 13% of the stock. This coarser fraction was then subjected to a further centrifugal impact step by another rotary impact machine of the pin rotor type at 30. This particular machine included a pin type rotor of substantially 24" diameter having a total of 48 pins on the rotor unit and rotating at a speed of substantially 3,500 r.p.m. All of the impacted flour obtained from this impact unit 30 was then found to be of high enough quality and sufficiently fine particle size to be re-combined with the fine cake flour discharged by the separator at 40. The finished cake flour at 32 thus had a uniform particle size substantially smaller than that of the orignial finished flour streams. The final cake flour resulting from this operation showed excellent cake and pastry making characteristics indicating that the fine particle size was achieved without substantial damage to the starch particles or flour granules and without loss of any substantial percentage of the initial flour streams as coarse clear flour.

Example 2

According to the present invention a soft wheat flour gradual reduction milling process was carried out on soft red winter wheat grown in the central area of the country (e.g., Ohio). In preparation for this process the tempered wheat was initially subjected to a pre-break operation involving impact and aspiration. The milling process itself was carried out with roller mills for the break and middlings reduction systems and the flour streams indicated at Fig. 2 were obtained from the first sizings, first middlings, stone stock, second middlings, 2—2 middlings, third middlings and fourth middlings reduction systems by sifting through 12xx silk screens. These flour streams were then combined and fed to a centrifugal air separator as indicated at 70 at the rate of 140 cwt. per hour. In this case the centrifugal air separator involved in 10' diameter Raymond "whizzer" type mechanical air separator operating at a rotary speed of substantially 275 r.p.m. The coarser tailings amounting to substantially 19 cwt. per hour discharged at 84 had an average particle size of 64 microns and included 3.7% of damaged starch as measured by an enzyme susceptibility test. These tailings were then fed in series through two centrifugal impact units 86 and 88, each of which consisted of a 15 h.p. commercially available "Entoleter" having 27" diameter with a 72 pin rotor operating at 3,500 r.p.m. After the first impact step, the average particle size of the flow at point 92 was 31 microns and the starch damage was 4.3%. At the end of the second impact step, the average particle size of the flour at point 94 was 23 microns and the strach damage was only 4.5%. The impacted flour was then recombined with the fine flour from the "whizzer" type separator and fed through normal final bleaching and sifting operations, the final sifting involving 9xx silk screens to yield a high quality fine cake flour of improved baking characteristics.

Example 3

According to the present invention a hard wheat flour gradual reduction milling process was carried out on hard red winter wheat grown in the Southwestern areas in which the tempered wheat was initially subjected to a pre-break operation involving impact and aspiration. The milling process itself was carried out with roller mills for the break and middlings reduction systems and normal finished flour streams were obtained from the first sizings, first middlings, stone stock, second middlings, 2—2 middlings, third middlings and fourth middlings reductions systems by sifting through 12xx silk screens. The stone stock flour stream was then fed in series through two centrifugal impact units, each of which consisted of a 15 h.p. commercially available "Entoleter" having a 27" diameter, 72 pin rotor operating at 3,500 r.p.m. The impacted flour was then fed through normal final bleaching and sifting operations, the final sifting involving 9xx silk screens to yield a high quality fine combination cake and bread wheat flour of improved baking characteristics. Comparative baking tests showed that the impacted stone stock flour yielded cakes of substantially better volume, texture, grain, symmetry and crumb color than the same flour without such an impact step.

According to the foregoing specification, improved methods have been disclosed both individually and in combination for the further processing of the normal finished flour streams of a gradual reduction milling process. These additional methods, processes and features substantially accomplish the objectives set forth at the beginning of this specification and make it possible to produce a higher yield or better quality of final cake flour than was possible with the best available prior art methods. Since minor variations and changes in the exact details of the process and apparatus features will be apparent to persons skilled in this field, it is intended that this invention shall cover all such changes and modifications as fall within the spirit and scope of the attached claims.

Now therefore we claim:

1. The method of making flour of improved baking characteristics which comprises producing flour from cereal grains by a gradual reduction milling process in which the normal final flour streams are obtained by sifting through a surface substantially equivalent to a 12xx silk screen, and thereafter subjecting at least one of the better normal final flour streams of said process, such as the sizings and higher quality middling flour streams, to an impact reduction step in which the coarser normal flour particles of said stream are substantially further reduced in size to an average particle size less than 35 microns.

2. The method according to claim 1 in which the normal breaking and reduction steps of the milling process are carried out on roller mills.

3. The method according to claim 1 in which the milling process includes a pre-break impact step and the normal breaking and reduction steps of the process are carried out on roller mills.

4. The method of making flour of improved baking characteristics which comprises producing flour from cereal grains by a gradual reduction milling process in which the normal final flour streams are obtained by sifting through a surface substantially equivalent to a 12xx silk screen, subjecting at least one of the normal final flour streams of said process to a further reduction step in which the coarser normal flour particles are substantially further reduced in size and controlling the severity and duration of said further reduction step thereby substantially maintaining the unbroken structure of the individual starch granules during such further reduction and thus holding the amount of starch damage of the further reduced particles below substantially 5% as measured by an enzyme susceptibility test.

5. The method of making flour of improved cake baking characteristics which comprises producing flour from soft wheat by a gradual reduction roller milling process in which the normal final flour streams are obtained by sifting through a surface substantially equivalent to a 12xx silk screen and subjecting at least one of said normal final flour streams to a further reduction step in which the coarser normal flour particles are reduced to an average particle size less than 30–35 microns, and controlling the severity and duration of said reduction step and thereby maintaining the amount of starch damage below substantially 5% as measured by an enzyme susceptibility test.

6. The method of making flour of finer average particle size with minimum starch damage which comprises producing flour from cereal grains by a gradual reduction milling process in which the normal final flour streams are obtained by sifting through surfaces substantially equivalent to a 12xx silk screen, classifying the particles in at least one of the normal final flour streams of said process according to particle size into a finer fraction and a coarser fraction, and subjecting at least the coarser fraction of said final flour stream to an impact reduction step in which the severity and duration of the reduction step are controlled to maintain the amount of starch damage of the impacted fraction below substantially 5% as measured by an enzyme susceptibility test.

7. The method of making flour of improved baking characteristics which comprises producing flour from soft wheat by a gradual reduction roller milling process in which the normal final flour streams are obtained by sifting through a surface substantially equivalent to a 12xx silk screen, and subjecting at least one of the better normal final flour streams such as the sizings and higher quality middlings flour streams to an impact reduction step in which at least the coarser normal flour particles of said stream are substantially further reduced in size to an average particle size less than 35 microns.

8. The method according to claim 7 in which at least one of said better normal final flour streams is classified into coarser and finer fractions and only said coarser fraction is subjected to said further impact step.

9. The method of making flour of improved cake baking characteristics from wheat types normally considered less desirable for such baking which comprises producing flour from a harder variety of wheat than is normally considered suitable for cake flour by a gradual reduction milling process in which the normal final flour streams are obtained by sifting through a surface substantially equivalent to a 12xx silk screen, and subjecting at least one of the better normal final flour streams such as the sizings and higher quality middlings flour streams to an impact reduction step in which at least the coarser normal flour particles of said stream are substantially further reduced in size to an average particle size less than 35 microns.

10. The method of making flour of improved cake baking characteristics which comprises producing flour from soft wheat by a gradual reduction roller milling process in which normal final flour streams are obtained from sizings and middlings by sifting through surfaces substantially equivalent to a 12xx silk screen, combining the final flour streams from the sizings and from at least part, but less than all, of the middlings, subjecting the combined final flour streams to an air classifying step and thereby obtaining a fine cake flour fraction and a coarser flour fraction, subjecting said coarser flour fraction to an impact reduction step in which the coarser normal flour particles are reduced to an average particle size less than 30–35 microns while maintaining the amount of starch damage below substantially 5% as measured by an enzyme susceptibility test, and recombining the impacted flour fraction with said fine cake flour fraction, thereby obtaining the desired final cake flour.

11. The method according to claim 10 in which at least one of the final flour streams to be combined is subjected to a preliminary impact reduction step before it is combined with said other final flour streams.

12. The method of making flour of improved cake baking characteristics which comprises producing flour from soft wheat by a gradual reduction roller milling process in which the normal final flour streams are obtained from sizings and middlings by sifting through surfaces substantially equivalent to a 12xx silk screen, combining the final flour streams from the sizings and from at least part, but less than all, of the middlings, subjecting the combined final flour streams to an air classifying step and thereby obtaining a fine cake flour fraction and a coarser flour fraction, and subjecting said coarser flour fraction to an impact reduction step in which the coarser normal flour particles are reduced to an average particle size less than 35 microns while maintaining the amount of starch damage below substantially 5% as measured by an enzyme susceptibility test.

References Cited in the file of this patent

UNITED STATES PATENTS

| 310,709 | Nagel et al. | Jan. 13, 1885 |
| 1,091,284 | Buckley | Mar. 24, 1914 |
| 2,464,212 | Carter | Mar. 15, 1949 |

FOREIGN PATENTS

| 563,666 | France | Oct. 3, 1923 |